United States Patent
Lee et al.

(10) Patent No.: US 10,020,927 B2
(45) Date of Patent: Jul. 10, 2018

(54) METHOD AND DEVICE FOR DECODING RECEPTION SIGNAL IN WIRELESS COMMUNICATION SYSTEM

(71) Applicant: Samsung Electronics Co., Ltd., Suwon-si, Gyeonggi-do (KR)

(72) Inventors: Hyo-Jin Lee, Suwon-si (KR); Cheol-Kyu Shin, Suwon-si (KR); Hyoung-Ju Ji, Seoul (KR); Yong-Jun Kwak, Yongin-si (KR); Young-Bum Kim, Seoul (KR); Youn-Sun Kim, Seongnam-si (KR); Ju-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 14/663,914

(22) Filed: Mar. 20, 2015

(65) Prior Publication Data

US 2015/0270918 A1    Sep. 24, 2015

(30) Foreign Application Priority Data

Mar. 21, 2014    (KR) .................... 10-2014-0033598

(51) Int. Cl.
*H04J 11/00*    (2006.01)
*H04L 5/00*    (2006.01)
(Continued)

(52) U.S. Cl.
CPC .......... *H04L 5/0073* (2013.01); *H04J 11/004* (2013.01); *H04L 1/0038* (2013.01);
(Continued)

(58) Field of Classification Search
None
See application file for complete search history.

(56) References Cited

U.S. PATENT DOCUMENTS 8,995,592 B2 *    3/2015    Dao ................. H04J 11/004
                                              375/316
2010/0054373 A1    3/2010    Reial
(Continued)

FOREIGN PATENT DOCUMENTS

KR    10-2014-0056899 A    5/2014

OTHER PUBLICATIONS

Meidatek Inc.; Network signaling and/or coordination for R-ML receivers; R1-134452; 3GPP TSG-RAN WG1 #74bis; Sep. 28, 2013; Guangzhou, China.
(Continued)

*Primary Examiner* — Kouroush Mohebbi
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method of decoding a reception signal having an interference signal included therein by User Equipment (UE) in a wireless communication system is provided. The method includes receiving the reception signal having the interference signal included therein, identifying at least one of transmission parameters for the interference signal, identifying a modulation scheme of the interference signal and reception strength of the interference signal using the identified transmission parameter, removing the interference signal from the reception signal based on the identified modulation scheme and the identified reception strength of the interference signal, and decoding the reception signal from which the interference signal is removed.

20 Claims, 9 Drawing Sheets

(51) Int. Cl.
*H04L 27/00* (2006.01)
*H04L 1/00* (2006.01)
*H04L 25/06* (2006.01)
*H04B 7/06* (2006.01)

(52) U.S. Cl.
CPC .......... *H04L 5/0023* (2013.01); *H04L 5/0057* (2013.01); *H04L 25/067* (2013.01); *H04L 27/0012* (2013.01); *H04B 7/063* (2013.01); *H04L 5/006* (2013.01)

(56) References Cited

U.S. PATENT DOCUMENTS

| | | | |
|---|---|---|---|
| 2013/0114437 A1* | 5/2013 | Yoo | H04J 11/005 370/252 |
| 2013/0156139 A1 | 6/2013 | Lee et al. | |
| 2013/0301757 A1 | 11/2013 | Dao et al. | |
| 2014/0126404 A1 | 5/2014 | Kim et al. | |

OTHER PUBLICATIONS

3GPP; 3GPP TR 36.866 V1.1.0; 3rd Generation Partnership Project; Technical Specification Group Radio Access Network; Network-Assisted Interference Cancellation and Suppression for LTE (Release 12); Dec. 16, 2013; France.

* cited by examiner

METHOD AND DEVICE FOR DECODING RECEPTION SIGNAL IN WIRELESS COMMUNICATION SYSTEM

CROSS-REFERENCE TO RELATED APPLICATION(S)

This application claims the benefit under 35 U.S.C. § 119(a) of a Korean patent application filed on Mar. 21, 2014 in the Korean Intellectual Property Office and assigned Serial No. 10-2014-0033598, the entire disclosure of which is hereby incorporated by reference.

TECHNICAL FIELD

The present disclosure relates to a method and device for decoding a reception signal in a wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

From the early stage of providing voice-oriented services, a mobile communication system has evolved into a high-speed, high-quality wireless packet data communication system to provide data and multimedia services. Various mobile communication standards, such as High Speed Downlink Packet Access (HSDPA), High Speed Uplink Packet Access (HSUPA), Long Term Evolution (LTE), and Long Term Evolution-Advanced (LTE-A) of the 3rd Generation Partnership Project (3GPP), High Rate Packet Data (HRPD) of the 3rd Generation Partnership Project-2 (3GPP2), and IEEE 802.16, have recently been developed to support high-speed and high-quality wireless packet data communication services. In particular, an LTE system, developed to efficiently support high-speed wireless packet data transmission, maximizes wireless system capability using various wireless access technologies. An LTE-A system is an advanced wireless system of an LTE system and has enhanced data transmission capability compared to the LTE system.

In general, a base station and a user equipment that correspond to the Release 8 or 9 of the 3GPP standard organization are employed for the LTE system, and a base station and a user equipment that correspond to the Release 10 of the 3GPP standard organization are employed for the LTE-A system.

The 3GPP standard organization has standardized the LTE-A system and discussions are now being held regarding the standard for a subsequent Release with improved performance based on the standardized LTE-A system.

The existing 3rd Generation (3G) and 4th Generation (4G) wireless packet data communication systems such as HSDPA, HSUPA, HRPD, and LTE/LTE-A employ an Adaptive Modulation and Coding (AMC) scheme, a channel-sensitive scheduling scheme, and the like to improve transmission efficiency. When the AMC scheme is employed, a transmitter can adjust the amount of transmission data depending on a given channel state. That is, when channel state is poor, a transmitter may adjust the reception error probability to a desired level by reducing the amount of transmission data, and when a channel state is good, the transmitter may efficiently transmit a large amount of information while adjusting the reception error probability to a desired level by increasing the amount of transmission data. With the use of the channel-sensitive scheduling-based resource management method, the transmitter selectively provides a service to a user having a good channel state among a plurality of users, thus increasing the system capacity compared to the method of assigning a channel to one user and providing a service to the user with the assigned channel. Such a capacity increase as in the above description is referred to as "multi-user diversity gain." In short, the AMC scheme and the channel-sensitive scheduling scheme are methods that allow a transmitter to apply an appropriate modulation and coding technique at a point of time that is determined to be most efficient based on partial channel state information fed back from a receiver.

The AMC scheme, when used together with a Multiple Input Multiple Output (MIMO) transmission scheme, may include a function of determining the rank or the number of spatial layers of a transmission signal. In determining the optimum data rate, the AMC scheme considers how many layers are to be used for transmission through the MIMO scheme, as well as a coding rate and a modulation scheme.

The MIMO scheme in which a wireless signal is transmitted using a plurality of transmission antennas may be classified into single user-MIMO (SU-MIMO) for transmission to one UE and multiuser-MIMO (MU-MIMO) for transmission to a plurality of UEs using the same time-frequency resource. In the SU-MIMO scheme, multiple transmission antennas transmit a wireless signal to one receiver through multiple spatial layers. At this time, the receiver has to include multiple reception antennas to receive the wireless signals through the multiple spatial layers. In contrast, in the MU-MIMO scheme, multiple transmission antennas transmit a wireless signal to multiple receivers through multiple spatial layers. The MU-MIMO has an advantage in that the receivers do not need multiple reception antennas, compared to the SU-MIMO. However, the MU-MIMO has a problem in that wireless signals are transmitted to the multiple receivers using the same frequency and time resource, thereby causing mutual interference between the wireless signals for the different receivers.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for decoding a reception signal in a wireless communication system.

Another aspect of the present disclosure is to provide a method and device for transmitting interference related control information for enhancing the reception performance of a receiver in a wireless communication system.

Another aspect of the present disclosure is to provide a method and device for allowing a receiver to perform decoding through interference removal and suppression in a wireless communication system.

In accordance with an aspect of the present disclosure, a method of decoding a reception signal having an interference signal included therein by a User Equipment (UE) in a wireless communication system is provided. The method includes receiving the reception signal having the interference signal included therein, identifying at least one of transmission parameters for the interference signal, identifying a modulation scheme of the interference signal and a reception strength of the interference signal using the identified transmission parameter, removing the interference signal from the reception signal based on the identified modulation scheme and the identified reception strength of the interference signal, and decoding the reception signal from which the interference signal is removed.

In accordance with an aspect of the present disclosure, a UE for decoding a reception signal having an interference signal included therein in a wireless communication system is provided. The UE includes a reception unit configured to receive the reception signal having the interference signal included therein, and a controller configured to identify at least one of transmission parameters for the interference signal, identify a modulation scheme of the interference signal and a reception strength of the interference signal using the identified transmission parameter, remove the interference signal from the reception signal based on the identified modulation scheme and the identified reception strength of the interference signal, and decode the reception signal from which the interference signal is removed.

As described above, according to various embodiments of the present disclosure, a user equipment that receives a downlink signal in a wireless communication system can effectively remove interference, thereby enhancing reception performance thereof.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, although the following description of various embodiments of the present disclosure will be directed to an orthogonal frequency division multiplexing (OFDM)-based wireless communication system, in particular, the 3rd Generation Partnership Project (3GPP) EUTRA standard, it can be understood by those skilled in the art that the present disclosure may also be applied to other communication systems having similar technical backgrounds and channel formats, with a slight modification, without substantially departing from the scope of the present disclosure.

Recently, intensive research is being conducted to replace code division multiple access (CDMA), the multiple access scheme used in the 2nd and 3rd generation mobile communication systems, with orthogonal frequency division multiple access (OFDMA) in the next generation system.

Further, 3GPP and 3GPP2 have started their standardizations on the evolved systems using OFDMA. It is generally known that, compared to the CDMA scheme, an increase in capacity can be expected when the OFDMA scheme is used. One of several causes of the increase in capacity that is achieve when the OFDMA scheme is used is that the OFDMA scheme may perform scheduling in a frequency domain (i.e., Frequency Domain Scheduling). Though the transceiver acquires capacity gain according to the time-varying channel characteristic using the channel-sensitive scheduling method, the transceiver can obtain higher capacity gain with use of the frequency-varying channel characteristic.

Figure 1:
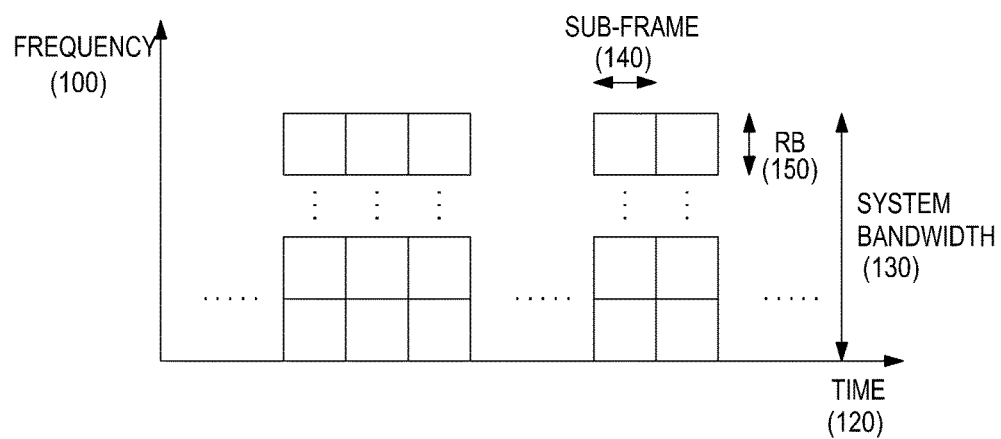
FIG. 1 illustrates time-frequency resources used in a wireless communication system according to an embodiment of the present disclosure.

FIG. 1 illustrates time-frequency resources used in a wireless communication system according to an embodiment of the present disclosure.

More specifically, FIG. 1 illustrates time-frequency resources used in a Long Term Evolution/Long Term Evolution-Advanced (LTE/LTE-A) communication system as an example.

Referring to FIG. 1, wireless resources that an enhanced NodeB (eNB) transmits to a user equipment (UE) are divided in units of a Resource Block (RB) 150 on a frequency axis 100 and in units of a sub-frame 140 on a time axis 120. In general, the RB 150 is configured with twelve subcarriers and occupies a system bandwidth 130 of 180 kHz in the LTE/LTE-A system. In contrast, the sub-frame 140 is generally configured with fourteen OFDM symbol intervals and occupies a time interval of 1 msec in the LTE/LTE-A system. In performing scheduling, the LTE/LTE-A system may allocate resources in units of the sub-frame 140 on the time axis 120 and in units of the RB 150 on the frequency axis 100.

Figure 2:
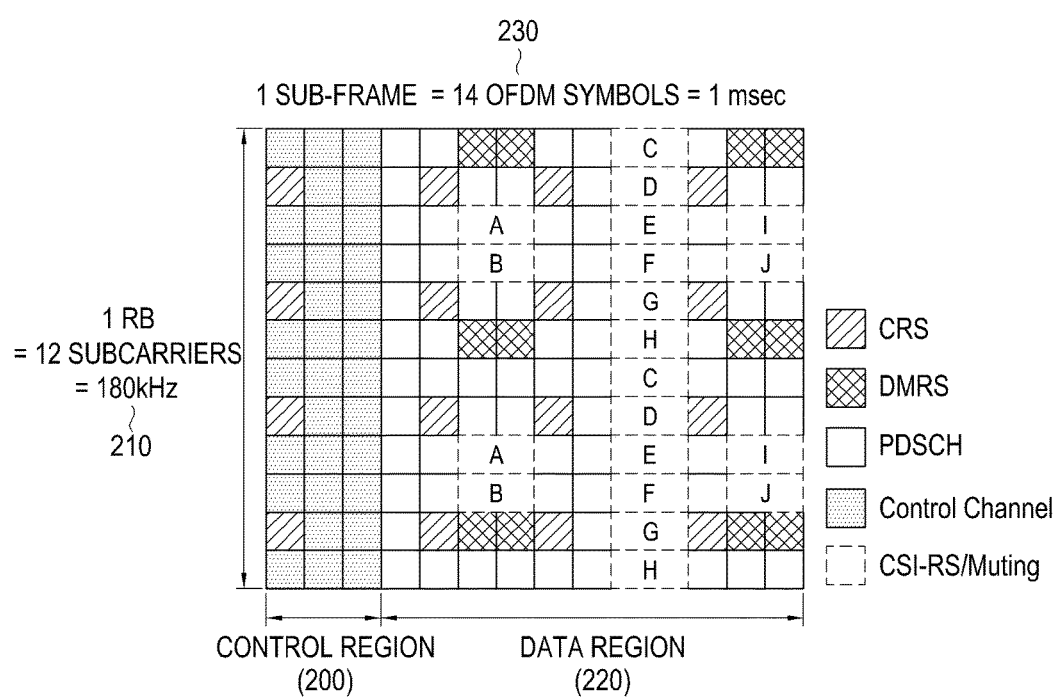
FIG. 2 illustrates a minimum resource allocation unit for downlink scheduling in a wireless communication system according to an embodiment of the present disclosure.

FIG. 2 illustrates a minimum resource allocation unit for downlink scheduling in a wireless communication system according to an embodiment of the present disclosure.

Referring to FIG. 2, a minimum resource allocation unit for downlink scheduling may be wireless resources configured with one sub-frame 230 and one RB 210. That is, the wireless resources are configured with one sub-frame 230 on the time axis and one RB 210 on the frequency axis. Such wireless resources are configured with twelve subcarriers in the frequency region and fourteen OFDM symbols in the time region to have a total of 168 natural frequencies and time locations. In LTE/LTE-A, such a natural frequency and time location as described above is referred to as a Resource Element (RE). In addition, one sub-frame 230 is configured with two slots, each of which is configured with seven OFDM symbols.

The following different types of signals may be transmitted using the wireless resources illustrated in FIG. 2.
1. Cell Specific RS (CRS): a reference signal transmitted for all UEs pertaining to one cell.
2. Demodulation Reference signal (DMRS): a reference signal transmitted for a particular UE.
3. Physical Downlink Shared Channel (PDSCH): a data channel transmitted via a downlink, which is employed for an eNB to transmit traffic to a UE, the traffic being transmitted using an RE for which a reference signal is not transmitted in a data region 220 of FIG. 2.
4. Channel Status Information Reference Signal (CSI-RS): a reference signal transmitted for UEs pertaining to one cell and used to measure a channel status in which a plurality of CSI-RSs may be transmitted in one cell.
5. Other control channels (PHICH, PCFICH, PDCCH, etc.): control channels for providing control information required for a UE to receive a PDSCH or transmitting ACK/NACK for operating HARQ for uplink data transmission. The control channels may be transmitted in a control region 200.

In addition to the aforementioned signals, muting may be set in the LTE-A system such that a CSI-RS transmitted by another eNB may be received by UEs of the corresponding cell without interference. The muting may be applied to a location where the CSI-RS may be transmitted. A UE generally skips the corresponding wireless resource to which the muting is applied and receives a traffic signal. In the LTE-A system, the muting is also called a zero-power CSI-RS as another term. That is because the muting is applied to a location of a CSI-RS due to the characteristic thereof and transmission power is not allocated.

In FIG. 2, CSI-RSs may be transmitted using some of the locations marked with A, B, C, D, E, F, G, H, I, and J according to the number of antennas that transmit the CSI-RSs. In addition, the muting may also be applied to some of the locations marked with A, B, C, D, E, F, G, H, I, and J. For example, CSI-RSs may be transmitted using two, four, or eight REs according to the number of transmission antenna ports. When the number of antenna ports is 2, a CSI-RS is transmitted to half of a particular pattern in FIG. 2, or when the number of antenna ports is 4, a CSI-RS is transmitted to the entirety of a particular pattern. Alternatively, when the number of antenna ports is 8, a CSI-RS is transmitted using two patterns. In contrast, the muting is always applied in units of one pattern. That is, although the muting may be applied to a plurality of patterns, the muting cannot be applied only to a part of one pattern when the location of the muting does not overlap with that of a CSI-RS. However, only when the locations of the CSI-RS and the muting overlap each other, the muting may be applied only to a part of one pattern.

In a wireless communication system, a reference signal has to be transmitted such that a downlink channel status can be measured. In a Long Term Evolution Advanced (LTE-A) system of 3GPP, a UE measures a channel status between an eNB and the UE using a CRS or a CSI-RS transmitted by the eNB. Some factors, including the amount of interference in a downlink, have to be fundamentally considered for the channel status. The amount of interference in the downlink includes an interference signal and thermal noise that are generated by an antenna pertaining to a neighboring eNB, and may be importantly used for the UE to determine the channel status of the downlink. In one example, when an eNB having one transmission antenna transmits a reference signal to a UE having one reception antenna, the UE has to determine a Signal to Noise plus Interference Ratio (SNIR) by determining energy per symbol, which can be received to a downlink, and an amount of interference, which will be simultaneously received in the interval in which the corresponding symbol is received, from the reference signal received from the eNB. The SNIR is a value obtained by dividing the power of the reception signal by interference and the strength of a noise signal. In general, better reception performance and a higher data transmission rate may be obtained with an increasing SNIR. The eNB may be notified of the determined SNIR, a value corresponding thereto, or the maximum data transmission rate supportable at the corresponding SNIR and determine a data transmission rate at which the eNB will perform the transmission to the UE via the downlink.

In a typical mobile communication system, an eNB is disposed at an intermediate location between cells and performs mobile communication with UEs using one or more antennas located at confined locations. The mobile communication system in which the antennas pertaining to one cell are disposed at the same location as described above is referred to as a centralized antenna system. In contrast, a mobile communication system in which Remote Radio Heads (RRHs) pertaining to one cell are disposed at distributed locations in a cell is referred to as a distributed antenna system.

Figure 3:
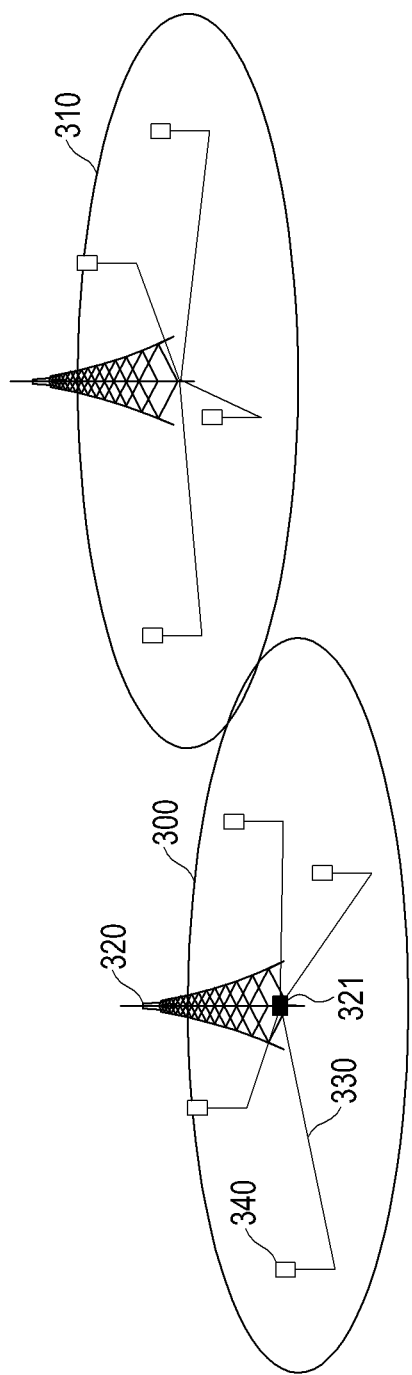
FIG. 3 illustrates antennas disposed at distributed locations in a distributed antenna system according to an embodiment of the present disclosure.

FIG. 3 illustrates antennas disposed at distributed locations in a distributed antenna system according to an embodiment of the present disclosure.

Referring to FIG. 3, the distributed antenna system may include, for example, two cells (i.e., a first cell 300 and a second cell 310). The first cell 300 includes a high-power antenna 320 and four low-power antennas (e.g., 340). The high-power antenna 320 may provide at least the minimum services over the entire cell area, whereas the low-power antennas may provide high data rate-based services to limited UEs in limited areas within the cell. In addition, as indicated by reference numeral 330, the low-power antennas and the high-power antenna are all connected to a central controller 321 to operate according to scheduling and wireless resource allocation of the central controller 321. In the distributed antenna system, one or more antennas may be disposed at the location of one geographically separated antenna. In an embodiment of the present disclosure, an antenna, or antennas, disposed at the same location in the distributed antenna system is called an antenna group (i.e., an RRH group).

In the distributed antenna system illustrated in FIG. 3, a UE receives a signal from one geographically separated antenna group, and signals transmitted from the remaining groups are considered as interference.

Figure 4:
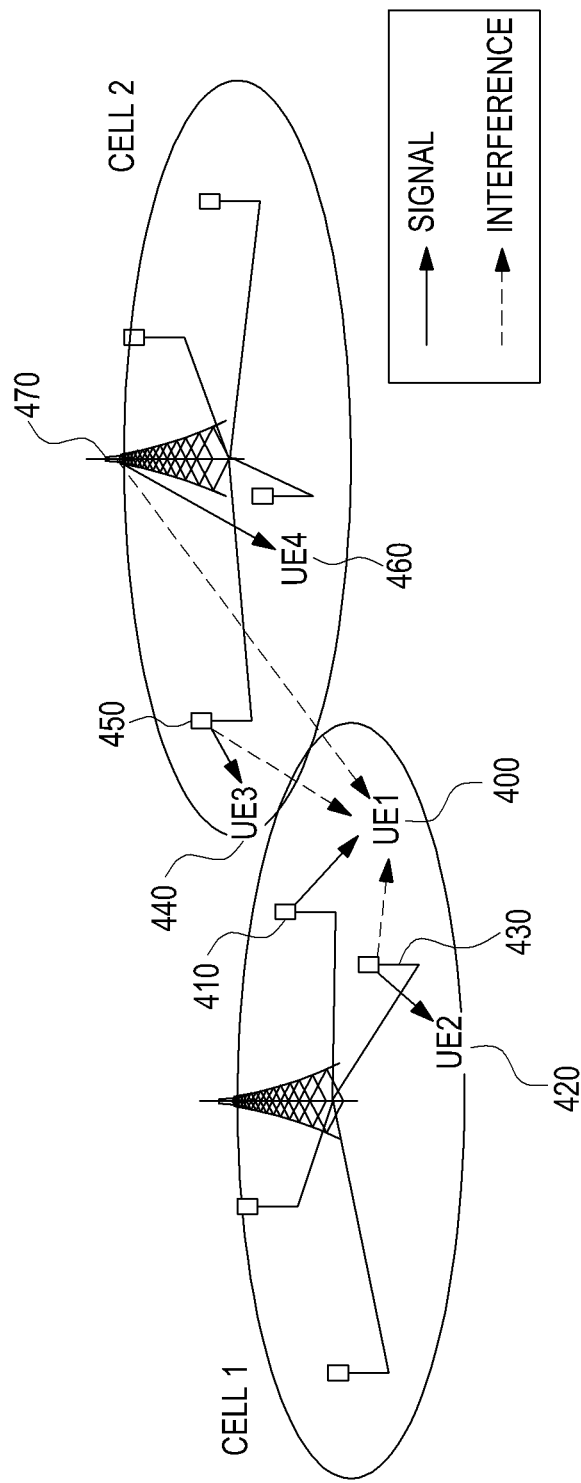
FIG. 4 illustrates an interference phenomenon occurring when respective antenna groups perform transmission to different User Equipments (UEs) in a distributed antenna system according to an embodiment of the present disclosure.

FIG. 4 illustrates an interference phenomenon occurring when respective antenna groups perform transmission to different UEs in a distributed antenna system according to an embodiment of the present disclosure.

Referring to FIG. 4, a UE 1 400 receives a traffic signal from a first antenna group 410. A UE 2 420 receives a traffic signal from a second antenna group 430, a UE 3 440 receives a traffic signal from a third antenna group 450, and a UE 4 460 receives a traffic signal from a fourth antenna group 470.

The UE 1 400 receives interference from the other antenna groups, which transmit the traffic signals to the other UEs, at the same time as receiving the traffic signal from the first antenna group 410. That is, the signals transmitted from the second, third, and fourth antenna groups 430, 450, 470 cause interference with UE 1 400.

In general, two types of interference caused by other antenna groups in a distributed antenna system are as follows:

Inter-cell interference: interference caused by antenna groups of different cells.

Intra-cell interference: interference caused by antenna groups of the same cell.

The intra-cell interference with the UE 1 400 of FIG. 4 includes interference caused by the second antenna group 430 pertaining to the same cell 1, and the inter-cell interference with the UE 1 400 includes interference caused by the third and fourth antenna groups 450, 470 of the neighboring cell 2. The inter-cell interference and the intra-cell interference are simultaneously received to the UE 1 400 to disturb data channel reception of the UE 1 400.

In general, when a UE receives a wireless signal, a desired signal is received together with noise and interference. The reception signal of the UE is expressed by the following Equation 1.

$$r = s + \text{noise} + \text{interference} \qquad \text{Equation 1}$$

In Equation 1, 'r' denotes the reception signal, 's' denotes a transmission signal, 'noise' denotes noise having Gaussian distribution, and 'interference' denotes an interference signal generated in wireless communication. The interference signal may be generated in the following cases.

Interference at a neighboring transmission point: a case in which a signal transmitted by a neighboring antenna in a neighboring cell or distributed antenna system interferes with a desired signal.

Interference at the same transmission point: a case in which signals for different UEs interfere with each other when MU-MIMO transmission is performed using a plurality of antennas at one transmission point.

An SNIR value may vary with the magnitude of interference, consequently affecting reception performance. In general, interference is the leading cause of system performance deterioration in a cellular mobile communication system, and system performance is determined depending on how to appropriately control the interference. Various standard technologies for supporting Coordinated Multi-Point Transmission and Reception (CoMP) that is cooperative communication are used for controlling interference in LTE/LTE-A. In the CoMP, a network comprehensively performs a centralized control of transmission from a plurality of eNBs or transmission points to determine the magnitude of interference and the presence or absence of interference in a downlink and an uplink. For example, in cases where two eNBs exist, the central controller of the network may interrupt signal transmission from eNB 2 such that eNB 1 does not cause interference with a UE receiving a signal.

In a wireless communication system, error correction coding is performed to correct an error in a transmission/reception process. In the LTE/LTE-A system, a convolution code and a turbo code is used for the error correction coding. In order to enhance decoding performance of the error correction coding, a receiver uses soft-decision instead of hard-decision when demodulating a modulated symbol such as a quad phase shift keying (QPSK–), a 16 quadrature amplitude modulation (QAM-), or a 64QAM-modulated symbol. When a transmitting end transmits +1 or −1, a receiver to which hard-decision is applied selects +1 or −1 for the reception signal to output it. In contrast, a receiver to which soft-decision is applied outputs information on which of +1 and −1 is received for the reception signal and the reliability of the corresponding decision. Such reliability information may be used to improve the decoding performance in a decoding process.

The receiver using soft-decision generally uses a Log Likelihood Ratio (LLR) to calculate an output value. In cases where a binary phase shift keying (BPSK) modulation scheme in which the transmission signal is +1 or −1 is applied, the LLR may be defined by the following Equation 2.

$$LLR = \log\frac{f(r|s = +1)}{f(r|s = -1)}$$ Equation 2

In Equation 2, 'r' denotes a reception signal, and 's' denotes a transmission signal. In addition, conditional probability density function $f(r|s=+1)$ represents a probability density function of the reception signal under the condition that +1 is transmitted as the transmission signal. Likewise, conditional probability density function $f(r|s=-1)$ represents a probability density function of the reception signal under the condition that −1 is transmitted as the transmission signal. Even in the case of a modulation scheme such as QPSK, 16QAM, or 64QAM, an LLR may be represented by a mathematical expression in a similar manner. The conditional probability density function has the Gaussian distribution in cases where interference does not exist.

Figure 5:
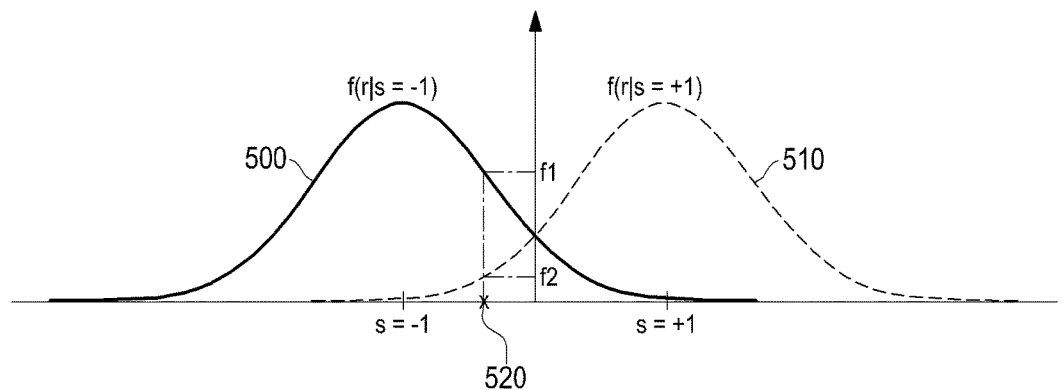
FIG. 5 is a graph representing a conditional probability density function according to an embodiment of the present disclosure.

FIG. 5 is a graph representing a conditional probability density function according to an embodiment of the present disclosure.

Referring to FIG. 5, a first graph 500 represents the conditional probability density function $f(r|s=-1)$, and a second graph 510 represents the conditional probability density function $f(r|s=+1)$. In cases where a reception signal has a value indicated by reference numeral 520 based on such conditional probability density functions, a receiver calculates an LLR through the mathematical expression log (f2/f1). The conditional probability density functions illustrated in FIG. 5 correspond to cases in which noise and interference follow a Gaussian distribution.

In a mobile communication system such as LTE/LTE-A system, an eNB transfers information of tens of bits or more to a UE through transmission of a PDSCH once. The eNB encodes information to transmit to the UE and then modulates the encoded information through a scheme, such as QPSK, 16QAM, or 64QAM, to transmit the modulated information. Accordingly, the UE having received the PDSCH creates LLRs for tens or more coding symbols and transfers the LLRs to a decoder in the process of demodulating tens or more modulation symbols.

Noise generally follows the Gaussian distribution. However, interference may not follow the Gaussian distribution according to circumstances. The representative reason why interference does not follow the Gaussian distribution is because the interference is a wireless signal for another receiver, unlike the noise. That is, since 'interference' in Equation 1 described above is a wireless signal for the other receiver, 'interference' is transmitted with the modulation scheme, such as BPSK, QPSK, 16QAM, or 64QAM, applied thereto. For example, in cases where an interference signal is modulated according to the BPSK modulation scheme, the interference has a probability distribution with a value of '+k' or '−k' at the same probability. Here, 'k' is determined by a signal strength attenuation effect of a wireless channel.

Figure 6:
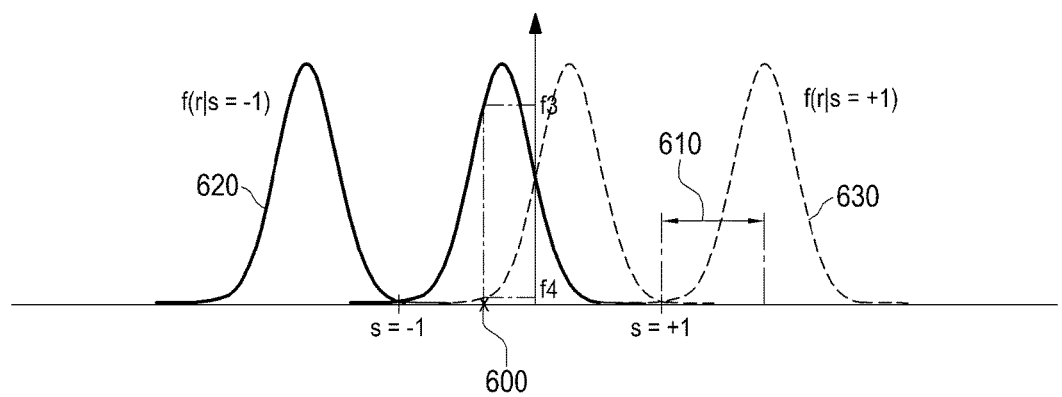
FIG. 6 is a graph representing a conditional probability density function in cases where a reception signal is transmitted after being modulated according to a binary phase shift keying (BPSK) modulation scheme and an interference signal is also transmitted after being modulated according to the BPSK modulation scheme according to an embodiment of the present disclosure.

FIG. 6 is a graph representing a conditional probability density function in cases where a reception signal is transmitted after being modulated according to a BPSK modulation scheme and an interference signal is also transmitted after being modulated according to the BPSK modulation scheme according to an embodiment of the present disclosure. In FIG. 6, it is assumed that noise follows the Gaussian distribution.

Referring to FIG. 6, it can be seen that the conditional probability density functions illustrated in FIG. 6 are different from those illustrated in FIG. 5. In FIG. 6, a first graph 620 represents the conditional probability density function $f(r|s=-1)$, and a second graph 630 represents the conditional probability density function $f(r|s=+1)$. The magnitude of a value indicated by reference numeral 610 may be determined depending upon the strength of the interference signal and may vary with an influence of a wireless channel. In cases where a reception signal has a value indicated by reference numeral 600 based on such conditional probability density functions, a receiver calculates an LLR through mathematical expression log (f4/f3). The calculated LLR is different from the LLR of FIG. 5 since the used conditional probability density functions differ from each other. That is, the LLR calculated in view of the modulation scheme of the interference signal is different from the LLR calculated in view of interference with Gaussian distribution.

Figure 7:
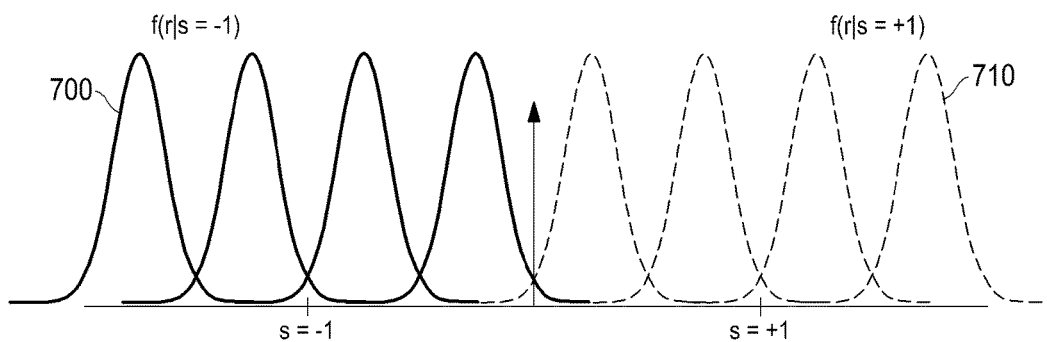
FIG. 7 is a graph representing a conditional probability density function in cases where a reception signal is transmitted after being modulated according to a BPSK modulation scheme and an interference signal is transmitted after being modulated according to a 16 quadrature amplitude modulation (QAM) modulation scheme according to an embodiment of the present disclosure.

FIG. 7 is a graph representing a conditional probability density function in cases where a reception signal is transmitted after being modulated according to a BPSK modulation scheme and an interference signal is transmitted after being modulated according to a 16QAM modulation scheme according to an embodiment of the present disclosure.

Referring to FIG. 7, it can be seen that a conditional probability density function varies with a modulation scheme of interference. In FIG. 7, a first graph 700 represents the conditional probability density function $f(r|s=-1)$, and a second graph 710 represents the conditional probability density function $f(r|s=+1)$. In FIGS. 6 and 7, a reception signal is transmitted after being modulated according to the BPSK modulation scheme. However, in FIG. 6, interference is modulated according to the BPSK scheme, whereas in FIG. 7, interference is modulated according to the 16QAM modulation scheme. That is, the conditional probability density function may vary with the modulation scheme of the interference signal even though the modulation scheme of the reception signal is the same, consequently making the calculated LLR different.

As described above with reference to FIGS. 5 to 7, the LLR value varies depending upon an assumption that the receiver makes about the interference to calculate the LLR. In order to optimize reception performance, the LLR value has to be calculated using a conditional probability density function reflecting statistical characteristics of actual interference or has to be calculated after the interference is previously removed. That is, in cases where interference has been transmitted after being modulated according to the BPSK modulation scheme, the LLR value has to be calculated under the assumption that the interference has been transmitted after being modulated in the receiver according to the BPSK modulation scheme, or the LLR value has to be calculated after removal of the interference modulated according to the BPSK. In cases where interference has been transmitted after being modulated according to the BPSK modulation scheme, if the receiver, without the interference removal process, simply assumes that the interference has the Gaussian distribution or that the interference has been transmitted after being modulated according to the 16QAM modulation scheme, a non-optimized LLR value is calculated, consequently making it very difficult to optimize reception performance.

Hereinafter, an embodiment of the present disclosure will be described. The embodiment of the present disclosure provides a method and device for transferring interference related control information in order to enhance reception performance of a UE that receives a downlink signal in a wireless communication system.

Figure 8:
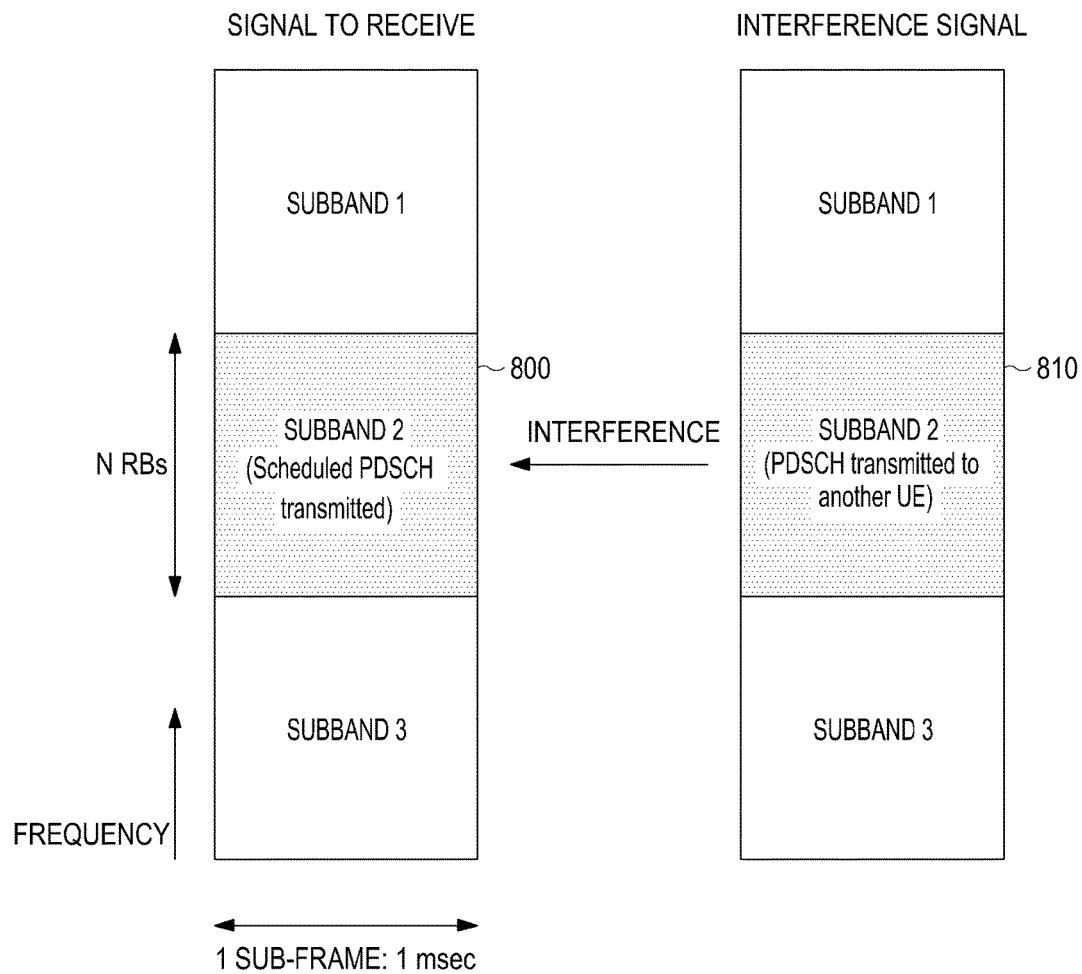
FIG. 8 illustrates a case in which interference is generated in a wireless communication system according to an embodiment of the present disclosure.

FIG. 8 illustrates a case in which interference is generated in a wireless communication system according to an embodiment of the present disclosure.

Referring to FIG. 8, a UE tries to receive a wireless signal 800. At this time, if a signal transmitted to another UE exists, the corresponding signal may act as interference with the UE. In an LTE/LTE-A system, interference may be generated when a signal which a UE tries to receive and an interference signal are transmitted in the same frequency interval of the same sub-frame. FIG. 8 illustrates an example in which the signal 800 which the UE tries to receive and an interference signal 810 are transmitted through N RBs.

In FIG. 8, in order to increase reception performance in a process of detecting the signal 800, the UE has to calculate an LLR value after removing the interference signal 810 or after accurately calculating a conditional probability density function reflecting statistical characteristics of the interference signal 810. The UE has to find at least a modulation scheme of the interference signal 810 and the strength of the received interference signal 810 in order to remove the interference signal 810 or induce the probability density function reflecting the statistical characteristics of the interference signal 810. In an LTE/LTE-A system, in order to identify a modulation scheme of an interference signal and the strength of the received interference signal, a UE has to be able to find at least one of the following transmission parameters for interference.

CRS information of an interference cell:
    Cell Identifier (ID)
    The number of CRS antenna ports
    Multimedia Broadcast multicast Service Single Frequency Network (MBSFN) sub-frame information
    Data RE to CRS EPRE ratio information
    PA, PB as per [TS 36.213 Section 5.2]
Network deployment information of an interference cell:
    Inter-eNB synchronization information
    Cyclic prefix information
    Sub-frame (or slot) number information
    Uplink/Downlink configuration information
    Transmission Mode (TM) information of interference PDSCH
PDSCH related dynamic transmission information of interference:
    Modulation order information
    RI: information on the number of transmission streams of interference PDSCH
    PMI: pre-coding information of interference PDSCH
    DMRS information (DMRSI)
        DMRS antenna port (DMRS-AP) information
        DMRS sequence information (virtual cell ID, scrambling ID)

In the LTE/LTE-A system, an available value for the transmission mode of the interference PDSCH among the transmission parameters for interference is TM1 to TM10, and a PDSCH transmission scheme for each mode refers to 3GPP TS 36.213. Some of the transmission parameters for interference may be transferred from an eNB to the UE through separate signaling, and others of the transmission parameters may be directly detected by the UE using a blind detection method. In addition, when the eNB signals a candidate set of available values of particular transmission parameters to the UE, the UE may detect the corresponding transmission parameter value of the interference signal among the received candidate set of the available parameter values using the blind detection method.

In an embodiment of the present disclosure, assuming that the eNB has informed, through higher layer signaling, the UE of the parameters which correspond to the CRS information of the interference cell, the network deployment information of the interference cell, and the transmission mode information of the interference PDSCH among the transmission parameters for interference or the UE is already aware of the corresponding parameters through the blind detection method, a method is considered in which the UE detects modulation order/RI/PMI or modulation order/DMRSI of the interference through the blind detection method to remove the interference signal or calculates a conditional probability density function reflecting statistical characteristics of the interference signal. However, without being limited to the above-described method, the modulation order/RI/PMI or the modulation order/DMRSI may also be detected together with some of the transmission parameters of different interference through the joint blind detection method.

It is assumed that the eNB has informed, through higher layer signaling, the UE of the parameters which correspond to the CRS information and the network deployment information of the interference cell among the transmission parameters for interference, or the UE is already aware of the corresponding parameters through the blind detection method. Further, when it is identified that some of TM 1 to TM 6 operating based on the CRS are available for the transmission mode of an interference PDSCH, the UE has to perform blind detection to identify the modulation order/RI/PMI information of the interference in order to remove the interference signal or calculate the conditional probability density function reflecting the statistical characteristics of the interference signal.

In order to describe a method of performing, by the UE, the blind detection of the modulation order/RI/PMI for the interference signal, the reception signal of the UE may be represented by the following Equation 3.

$$y_k = H_k^S x^S + H_k^I x^I + w \qquad \text{Equation 3}$$

In Equation 3, $H_k^S$ denotes a channel to the UE from an eNB that the UE accesses in the k-th RE, and $x^S$ denotes a transmission signal vector transmitted to the UE. $H_k^I$ denotes a channel through which an interference signal is transmitted in the k-th RE, $x^I$ denotes an interference signal vector, and w denotes Gaussian noise with a variance of $\sigma^2$. Then, the Approximated Maximum Likelihood (AML) detection method, which is one of the methods of performing, by the UE, the blind detection of the modulation order/RI/PMI for the interference signal, is given by the following Equation 4.

$$\{\hat{R}, \hat{P}, \hat{S}\} = \underset{\{R, P_R, S_R\}}{\arg\max} \left( \frac{1}{N_{RE}} \sum_{k=1}^{N_{RE}} \left( -\frac{1}{\sigma^2} \left\| y_k - H_k^I P_R s_{min}^{P_R} \right\|^2 \right) - \ln(\pi \sigma^2 |S_n|) \right) \qquad \text{Equation 4}$$

In Equation 4, $\hat{H}_k^I$ denotes a matrix value obtained by estimating a channel through which the interference signal is transmitted, and is estimated through the CRS for an interference cell. R denotes transmission rank values applicable to the interference signal, and $P_R$ denotes available pre-coding matrices for the rank value of the corresponding R. Here, as the transmission rank applicable to the interference signal and the available pre-coding matrices thereof, all available ranks and pre-coding matrices defined in LTE/LTE-A for the number of CRS antenna ports may be considered, or a set of available ranks and pre-coding matrices separately notified through a higher layer signal may also be considered.

In Equation 4, $S_n$ denotes a signal constellation for modulation order n. In the case of LTE/LTE-A, n=2, 4, 6 (or 8) is possible, and QPSK, 16QAM, 64QAM, (or 256QAM) is applied thereto. $|S_n|$ denotes the number of elements in the signal constellation and is calculated with $2^n$ for each n value. $S_{min}^{P_R}$ denotes a symbol having the minimum Euclidean distance from a reception vector among the elements in the given signal constellation for the given rank and pre-coding matrix and may be given by the following Equation 5.

$$s_{min}^{P_R} = \arg\max_{s \in S_R} \|y_k - H_k^I P_R s\|^2 \quad \text{Equation 5}$$

Lastly, if NRE of Equation 4 and a set of RE samples to be used in the blind detection are determined, the UE may perform the blind detection of the modulation order/RI/PMI through the AML scheme. The set of RE samples which the UE uses for the blind detection of the modulation order/RI/PMI has to have the same modulation order/RI/PMI applied thereto and the same power level. Accordingly, the UE has to perform the blind detection using only the pure PDSCH REs except for a CRS, a DMRS, a control channel, a CSI-RS, and muting within a basic unit of the interference PDSCH scheduling. Here, the basic unit of the interference PDSCH scheduling may be one RB or a set of RBs depending upon systems.

In LTE/LTE-A, the location of a DMRS within an RB is constantly determined for the number of DMRS antenna ports. Therefore, when the UE determines RE samples to apply the blind detection within the basic unit of the interference PDSCH scheduling, the UE may identify the presence or absence of the DMRS using interference PDSCH information including TM information of interference transferred via a higher layer signal or using the blind detection method, and when the DMRS exists, the UE determines the RE samples to apply the blind detection of the modulation order/RI/PMI, avoiding the corresponding REs. FIG. 2 is referred to for the location of the DMRS within the RB in the LTE/LTE-A. In addition, since the location of the CRS is also determined depending upon the cell ID of an interference cell, the number of CRS antenna ports, and MBSFN sub-frame information, the UE having acquired CRS information of the interference cell may identify the CRS location of the interference cell in a relatively easy and simple manner.

REs used for a CSI-RS and muting are relatively fixedly used according to eNBs. Therefore, the UE may be separately notified of the locations of the REs corresponding to the CSI-RS and muting of the interference cell and then apply the blind detection of the modulation order/RI/PMI, avoiding the corresponding REs.

As described above, the UE may determine the set of RE samples to be used for the blind detection, utilizing the remaining RB regions except for the available CRS location, the DMRS location, and the REs corresponding to the CSI-RS and muting.

Figure 9:
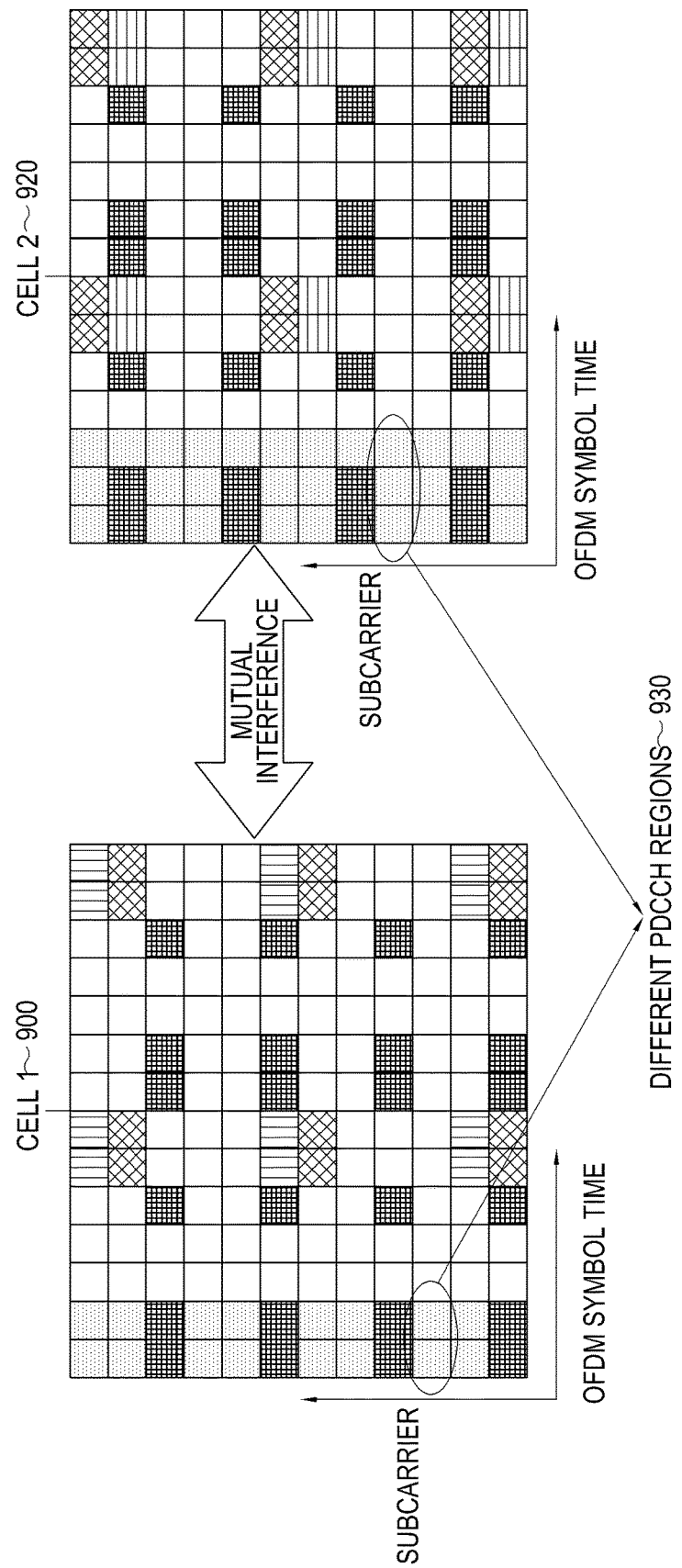
FIG. 9 illustrates wireless resources of respective cells having different control channel regions according to an embodiment of the present disclosure.

FIG. 9 illustrates wireless resources of respective cells having different control channel regions according to an embodiment of the present disclosure.

Referring to FIG. 9, the UE also needs to identify the location of the control channel (PCFICH, PDCCH, and PHICH) of the interference cell in a particular sub-frame. That is, in an LTE/LTE-A system, respective cells 900, 920 may have different control channel regions 930 and therefore, an assumption about the control channel region of an interference cell may affect the blind detection and data decoding performance of the UE.

The number of OFDM symbols used for the control channel in the LTE/LTE-A system is listed in Table 1 below, and the number of corresponding OFDM symbols may vary for each sub-frame.

TABLE 1

| Sub-frame | Number of control channel OFDM symbols (more than 10 downlink RBs) | Number of control channel OFDM symbols (10 or fewer downlink RBs) |
| --- | --- | --- |
| TDD sub-frame No. 1 or 6 | 1 or 2 | 2 |
| For 1 or 2 CRS port MBSFN sub-frame | 1 or 2 | 2 |
| For 4 CRS port MBSFN sub-frame | 2 | 2 |
| Sub-frame in which PDSCH is not transmitted | 0 | 0 |
| Non-MBSFN sub-frame in which Positioning Reference Signal (PRS) is configured | 1 or 2 or 3 | 2 or 3 |
| All other cases | 1 or 2 or 3 | 2 or 3 or 4 |

In a first method of performing blind detection in view of the number of OFDM symbols of an interference cell control channel and calculating an LLR value in view of interference removal or interference, the UE directly decodes a PCFICH of the interference cell, interprets information on a control channel region of the interference to avoid the corresponding OFDM symbol and perform the blind detection, and calculates the LLR value in view of the interference removal or the interference. That is, since a method of scrambling, coding, and transmitting the location of an RE to which the PCFICH is transmitted and data is determined by the number of CRS ports of the interference cell, a cell ID, a transmission slot number, and a downlink bandwidth (or the total number of RBs), the UE may decode the PCFICH of the interference cell based on information from a higher layer signal or corresponding values assumed by the UE and may accordingly identify the number of OFDM symbols of the control channel for the interference cell. When directly decoding the PCFICH of the interference cell as described above, if the UE additionally knows MBSFN sub-frame information of the interference cell or sub-frame information transmitted by a PRS as well, the UE may obtain more accurate information on the control channel region from the values defined in Table 1. If the UE cannot find the MBSFN sub-frame information of the interference cell or the sub-frame information transmitted by the PRS, the UE may decode the PCFICH under the assumption that the interference cell also has the same MBSFN sub-frame as the cell which the corresponding UE accesses or the sub-frame allocation transmitted by the PRS, and may identify, from Table 1, the number of OFDM symbols of the control channel for the interference cell.

However, the method of directly decoding the PCFICH to identify the number of OFDM symbols used for the interference cell control channel does not ensure decoding reliability of the PCFICH for the interference cell, and since the number of OFDM symbols used for the control channel is finally determined by a plurality of parameters transferred via a higher layer signal in addition to a value transmitted via the PCFICH, the UE may not accurately identify, through the method, the number of OFDM symbols used for the control channel in the interference cell. In addition, the method has a problem in that a data decoding performance gain in view of the interference of the UE is not high, compared to an increase in complexity of the UE required for separately decoding the PCFICH of the interference.

In a second method of performing blind detection in view of the number of OFDM symbols of an interference cell control channel and calculating an LLR value in view of interference removal or interference, the UE performs the blind detection and calculates the LLR value in view of the interference removal or the interference under the assumption that a control channel region of the interference cell is always the same as that of the cell which the UE accesses. In this case, the UE assumes that eNBs located adjacent to each other cooperate to have the same control channel region, and additional complexity is not required to identify the control channel region of the interference. In this case, although UEs that operate by calculating the LLR value in view of the interference removal or the interference obtain a performance gain, the entire system performance enhancement is not secured due to a limitation that all neighboring eNBs are to have the same control channel region.

In a third method of performing blind detection in view of the number of OFDM symbols of an interference cell control channel and calculating an LLR value in view of interference removal or interference, the UE is notified of an assumption about the control channel region of the interference cell via a higher layer signal and performs the blind detection and calculates the LLR value in view of the interference removal or the interference under the assumption that the PDSCH of the interference is not transmitted from the corresponding control channel region. Even in this case, a system operates under the assumption that neighboring eNBs may share information on the control channel and cooperate with each other, and therefore, there may be limitations in setting control channel regions of the eNBs.

In a fourth method of performing blind detection in view of the number of OFDM symbols of an interference cell control channel and calculating an LLR value in view of interference removal or interference, the UE performs the blind detection and calculates the LLR value in view of the interference removal or the interference under the assumption that the number of OFDM symbols of the control channel of the interference is always assumed to be a particular value and the PDSCH of the interference is not transmitted from the corresponding OFDM symbols. For example, under the assumption that the number of OFDM symbols of the control channel of the interference is assumed to be the maximum value of 4 in Table 1 and the PDSCH of the interference is not transmitted from the corresponding OFDM symbols, the UE performs the blind detection and calculates the LLR value in view of the interference removal or the interference to proceed with decoding. The reason for selecting the maximum value in Table 1 is because poor performance may be exhibited in a case where, under an erroneous assumption, the UE calculates the LLR value in view of the interference removal or the interference to proceed with decoding, compared to a case where the existing decoding scheme is used without an assumption about the interference. That is, the maximum value is used because, when the UE calculates the LLR value for decoding, an LLR value assuming the existing interference as noise is used for a PDSCH RE transmitted from an OFDM symbol prior to the fourth OFDM symbol, and interference is removed or an LLR value improved in view of the interference is used after the fifth OFDM symbol, thereby at least securing UE reception performance better than the existing decoding performance.

If the UE may find the number of downlink RBs of the interference cell, the fourth method of performing blind detection in view of the number of OFDM symbols of an interference cell control channel and calculating an LLR value in view of interference removal or interference can be improved by separating the method, based on Table 1, into a case in which the number of downlink RBs of the interference cell is smaller than or equal to 10 and a case in which the number of downlink RBs of the interference cell exceeds 10. That is, in Table 1, the maximum number of control channel OFDM symbols is 4 in the case in which the number of downlink RBs of the interference cell is smaller than or equal to 10, and 3 in the case in which the number of downlink RBs of the interference cell exceeds 10. Therefore, the UE may assume the number of OFDM symbols of the interference control channel corresponding thereto to perform the blind detection and calculate the LLR value in view of the interference removal or the interference. The above-described assumption about the interference control channel region of the UE for the number of downlink RBs of the interference cell is listed in Table 2 below.

TABLE 2

| Number of control channel OFDM symbols (more than 10 downlink RBs) | Number of control channel OFDM symbols (10 or fewer downlink RBs) |
|---|---|
| 3 | 4 |

Furthermore, if the UE may identify MBSFN sub-frame information of the interference cell, it is possible to additionally improve, according to Table 1, the operation of removing the interference and calculating the LLR in view of the interference. That is, since the number of maximum control channel regions is 2 for the MBSFN sub-frame in Table 1, the UE may more accurately assume the number of control channel regions of the interference cell with this point in view. That is, the UE performs the blind detection and calculates the LLR value in view of the interference removal or the interference by assuming the number of control channel OFDM symbols of the interference cell as 2 in a case in which the interference cell corresponds to an MBFSN sub-frame and as 3 or 4 in a case in which the interference cell corresponds to a general sub-frame. The assumption about the interference control channel region using the MBSFN sub-frame information is listed in Table 3 below.

TABLE 3

| Sub-frame | Number of control channel OFDM symbols (more than 10 downlink RBs) | Number of control channel OFDM symbols (10 or fewer downlink RBs) |
| --- | --- | --- |
| MBSFN sub-frame | 2 | 2 |
| Sub-frame in which PDSCH is not transmitted | 0 | 0 |
| Non-MBSFN sub-frame | 3 | 4 |

In cases where the UE operates with an assumption about the number of OFDM symbols of the particular interference cell, if the UE may additionally identify a TDD sub-frame number or identify PRS transmission information or information on a sub-frame in which a PDSCH is not transmitted, the UE may perform the blind detection and calculate the LLR value in view of the interference removal or the interference based on the number of interference control channel OFDM symbols listed in Table 4 below. For reference, the UE may also operate by setting the number of interference control channel OFDM symbols in view of only a particular portion instead of all rows and columns of Table 4. That is, the UE may always operate based on the second column without considering the number of downlink RBs of the interference or may operate based only on the second, third, and sixth rows without considering the configuration situation of a PRS, or without also considering the sub-frame in which the PDSCH is not transmitted.

TABLE 4

| Sub-frame | Number of control channel OFDM symbols (more than 10 downlink RBs) | Number of control channel OFDM symbols (10 or fewer downlink RBs) |
| --- | --- | --- |
| TDD sub-frame No. 1 or 6 | 1 or 2 | 2 |
| MBSFN sub-frame | 2 | 2 |
| Sub-frame in which PDSCH is not transmitted | 0 | 0 |
| Non-MBSFN sub-frame in which PRS is configured | 3 | 3 |
| All other cases | 3 | 4 |

In an embodiment of the present disclosure, a method is considered for performing decoding by performing the blind detection of the modulation order/RI/PMI using the AML blind detection scheme and calculating the LLR value in view of the interference removal or the interference. However, the embodiment of the present disclosure is not limited only to using the AML blind detection scheme, and the method of determining RE samples for the blind detection and the improved LLR calculation and the method of identifying an RI and a pre-coding matrix may be applied even when a different type of blind detection method is used.

Hereinafter, a method of improving reception performance through the above-described interference removal and suppression of the UE will be described with reference to FIG. 10.

Figure 10:
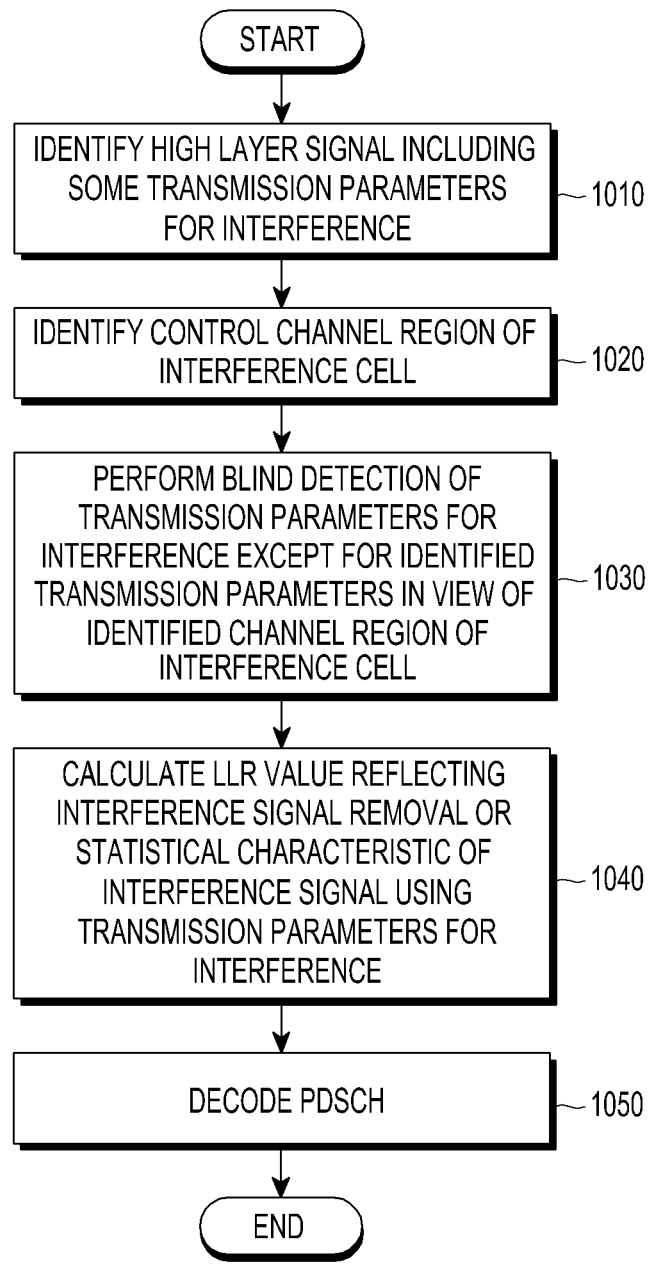
FIG. 10 is a flowchart illustrating a decoding process of a UE according to an embodiment of the present disclosure.

FIG. 10 is a flowchart illustrating a decoding process of a UE according to an embodiment of the present disclosure.

Referring to FIG. 10, in operation 1010 the UE identifies a high layer signal including some transmission parameters for interference to start an interference removal and suppression process. Here, the high layer signal may include the above-described CRS information of an interference cell, CSI-RS information, a downlink bandwidth (or the total number of RBs), a sub-frame in which a PRS may be transmitted, and MBSFN sub-frame information.

In operation 1020, the UE identifies a control channel region of an interference cell using the above-described methods of performing blind detection in view of the number of OFDM symbols of an interference cell control channel and calculating an LLR value in view of interference removal or interference. In operation 1030, the UE performs blind detection of transmission parameters for interference except for the identified transmission parameters in view of the identified control channel region of the interference cell. That is, the UE performs blind detection of RI/PMI in a set of available transmission ranks and pre-coding matrices in view of the identified control channel region of the interference cell and additionally performs blind detection for a modulation scheme as well. Here, the blind detection of the modulation scheme/RI/PMI may be performed jointly or sequentially. RE samples used for the blind detection are determined using the above-described control channel region information of the interference.

In operation 1040, in view of the identified control channel region of the interference, the UE calculates an LLR value through a conditional probability density function, which reflects interference signal removal or statistical characteristics of an interference signal, using the transmission parameters for the interference including the result obtained by performing the bind detection on the modulation scheme/RI/PMI. In operation 1050, the UE performs PDSCH decoding based on the calculated LLR value.

Figure 11:
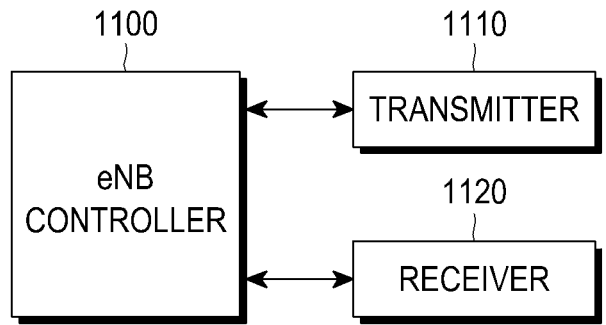
FIG. 11 is a block diagram of an enhanced NodeB (eNB) for supporting the improvement of the UE receiver performance through interference removal and suppression according to an embodiment of the present disclosure.

FIG. 11 is a block diagram of an eNB for supporting improvement of UE receiver performance through interference removal and suppression according to an embodiment of the present disclosure.

Referring to FIG. 11, a controller 1100 of the eNB sets an interference cell for a particular UE and transmission parameters of the interference cell to transfer to the UE and determines some of PDSCH scheduling, a corresponding CSI-RS, CRS information, a downlink bandwidth (or the total number of RBs), a sub-frame in which a PRS may be transmitted, and MBSFN sub-frame information. The transmission parameters of the interference cell of the UE determined by the eNB are transmitted to the UE by a transmitter 1110. In addition, control information and a PDSCH is transmitted to the UE by the transmitter 1110 according to the PDSCH scheduling determined by the eNB. The eNB receives, from a receiver 1120, channel status information for PDSCH transmission and PDSCH scheduling of the UE.

Figure 12:
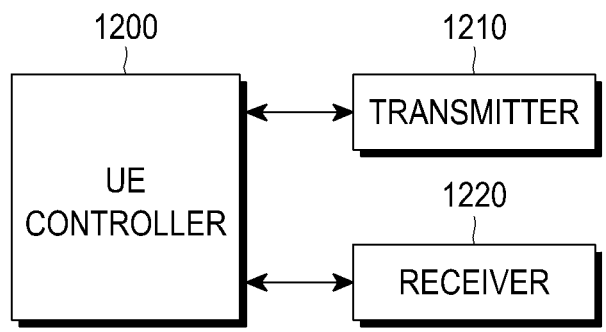
FIG. 12 is a block diagram of a UE for interference removal and suppression according to an embodiment of the present disclosure.

FIG. 12 is a block diagram of a UE for interference removal and suppression according to an embodiment of the present disclosure.

Referring to FIG. 12, a controller 1200 of the UE receives control information on transmission parameter setting of an interference cell from an eNB using a receiver 1220. The controller 1200 of the UE identifies a control channel region of the interference cell, determines an available set of RI and pre-coding matrix information for the blind detection and of which wireless resources are used to measure an interference channel and perform blind detection, performs the blind detection, and performs decoding through interference removal and suppression. The receiver 1220 may enable the controller 1200 of the UE to determine scheduling information of a PDSCH from the control information. The UE is further provided with a transmitter 1210 for transmission of various parameters as needed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of decoding a signal by a user equipment (UE) in a wireless communication system, the method comprising;
receiving a reception signal;
performing blind detection for dynamic information on an interference channel, the dynamic information being included in at least one transmission parameter for an interference signal;
identifying a modulation scheme of the interference signal and a reception strength of the interference signal based on a result of the blind detection for the dynamic information on the interference channel;
removing an interference signal from the reception signal based on the identified modulation scheme and the identified reception strength of the interference signal; and
decoding the reception signal from which the interference signal is removed,
wherein the at least one transmission parameter comprises information on a transmission mode performed based on a reference signal of the interference channel, and
wherein the blind detection for the dynamic information on the interference channel is performed on resources to which user data is allocated.

2. The method of claim 1, wherein the at least one transmission parameter further comprises at least one of cell specific reference signal (CRS) information of an interference cell, or network deployment information of the interference cell.

3. The method of claim 2, wherein the dynamic information on the interference channel comprises information on a modulation order, a rank identifier (RI), and a pre-coding matrix indicator (PMI) of the interference signal.

4. The method of claim 2, wherein the performing of the blind detection for the dynamic information of the interference channel is performed on the resources to which the user data is allocated, except for a resource to which a reference signal of the interference cell is allocated and a resource to which a control signal of the interference cell is allocated.

5. The method of claim 4, wherein the performing of the blind detection for the dynamic information on the interference channel comprises:
performing the blind detection in view of the number of orthogonal frequency division multiplexing (OFDM) symbols of a control channel to which the control signal of the interference cell is allocated.

6. The method of claim 5, wherein the performing of the blind detection in view of the number of OFDM symbols of the control channel comprises:
receiving region information of the control channel of the interference cell from an enhanced nodeB (eNB); and
performing the blind detection on a resource except for a resource where the OFDM symbols of the control channel are located, based on the received region information of the control channel.

7. The method of claim 5, wherein the performing of the blind detection in view of the number of OFDM symbols of the control channel is executed on an assumption that a control channel region of the interference cell is the same as that of a cell that the UE accesses.

8. The method of claim 5, wherein the performing of the blind detection in view of the number of OFDM symbols of the control channel comprises:
receiving region information of the control channel of the interference cell from an enhanced nodeB (eNB); and
performing the blind detection in the control channel region on an assumption that data of the interference cell is not transmitted.

9. The method of claim 5, wherein the performing of the blind detection in view of the number of OFDM symbols of the control channel is executed on an assumption that the number of OFDM symbols of a control channel region of the interference cell corresponds to a predetermined value.

10. The method of claim 2, further comprising:
identifying the CRS information of the interference cell included in the at least one transmission parameter, the network deployment information of the interference cell, and the transmission mode information of the interference channel by signaling from an enhanced nodeB (eNB) or blind detection of the UE.

11. A user equipment (UE) for decoding a signal in a wireless communication system, the UE comprising;
a receiver configured to receive a reception signal; and
at least one processor configured to:
performing blind detection for dynamic information on an interference channel, the dynamic information being included in at least one transmission parameter for an interference signal,
identify a modulation scheme of the interference signal and a reception strength of the interference signal based on a result of the blind detection for the dynamic information on the interference channel,
remove an interference signal from the reception signal based on the identified modulation scheme and the identified reception strength of the interference signal; and
decode the reception signal from which the interference signal is removed,
wherein the at least one transmission parameter comprises information on a transmission mode performed based on a reference signal of the interference channel, and
wherein the blind detection for the dynamic information on the interference channel is performed on resources to which user data is allocated.

12. The UE of claim 11, wherein the at least one transmission parameter further comprises at least one of cell specific reference signal (CRS) information of an interference cell, or network deployment information of the interference cell.

13. The UE of claim 12, wherein the dynamic information on the interference channel comprises information on a modulation order, a rank identifier (RI), and a pre-coding matrix indicator (PMI) of the interference signal.

14. The UE of claim 12, wherein the at least one processor is further configured to perform the blind detection for the dynamic information of the interference channel on the resources to which the user data is allocated, except for a resource to which a reference signal of the interference cell is allocated and a resource to which a control signal of the interference cell is allocated.

15. The UE of claim 14, wherein the at least one processor is further configured to perform the blind detection in view of the number of orthogonal frequency division multiplexing (OFDM) symbols of a control channel to which the control signal of the interference cell is allocated.

16. The UE of claim 15, wherein the at least one processor is further configured to receive region information of the control channel of the interference cell from an enhanced nodeB (eNB) and perform the blind detection on a resource except for a resource where the OFDM symbols of the control channel are located, based on the received region information of the control channel.

17. The UE of claim 15, wherein the at least one processor is further configured to perform the blind detection on an assumption that a control channel region of the interference cell is the same as that of a cell that the UE accesses.

18. The UE of claim 15, wherein the at least one processor is further configured to receive region information of the control channel of the interference cell from an enhanced nodeB (eNB) and perform the blind detection in the control channel region on an assumption that data of the interference cell is not transmitted.

19. The UE of claim 15, wherein the at least one processor is further configured to perform the blind detection on an assumption that the number of OFDM symbols of a control channel region of the interference cell corresponds to a predetermined value.

20. The UE of claim 12, wherein the at least one processor is further configured to identify the CRS information of the interference cell, the network deployment information of the interference cell, and the transmission mode information of the interference channel by signaling from an enhanced nodeB (eNB) or blind detection.

* * * * *